United States Patent
Slabaugh

(10) Patent No.: US 10,837,222 B2
(45) Date of Patent: Nov. 17, 2020

(54) DRAW-TIGHT APPARATUS FOR RAMP DOORS AND THE LIKE

(71) Applicant: Delbert L. Slabaugh, Nappanee, IN (US)

(72) Inventor: Delbert L. Slabaugh, Nappanee, IN (US)

(*) Notice: Subject to any disclaimer, the term of this patent is extended or adjusted under 35 U.S.C. 154(b) by 0 days.

(21) Appl. No.: 15/998,076

(22) Filed: Jun. 25, 2018

(65) Prior Publication Data
US 2019/0389358 A1    Dec. 26, 2019

(51) Int. Cl.
| | |
|---|---|
| *E06B 3/52* | (2006.01) |
| *E05F 15/00* | (2015.01) |
| *E05D 15/56* | (2006.01) |
| *B60P 1/43* | (2006.01) |
| *E05F 7/02* | (2006.01) |
| *E05F 15/627* | (2015.01) |

(52) U.S. Cl.
CPC ............... *E06B 3/52* (2013.01); *B60P 1/43* (2013.01); *B60P 1/438* (2013.01); *E05D 15/56* (2013.01); *E05F 7/02* (2013.01); *E05F 15/00* (2013.01); *E05F 15/627* (2015.01); *E05Y 2900/512* (2013.01)

(58) Field of Classification Search
CPC .......... E05C 19/006; B60P 1/438; E05F 7/02; E05F 15/627; E05D 15/56
USPC ............ 49/254–256; 296/50, 56, 57.1
See application file for complete search history.

(56) References Cited

U.S. PATENT DOCUMENTS

| | | | | |
|---|---|---|---|---|
| 3,791,073 A * | 2/1974 | Baker | ............... | B64C 1/1407 |
| | | | | 49/249 |
| 3,820,282 A * | 6/1974 | Kornylak | ............... | E05F 7/02 |
| | | | | 49/255 |
| 4,850,140 A * | 7/1989 | Compeau | ............... | E05F 15/627 |
| | | | | 49/347 |
| 5,341,597 A * | 8/1994 | Stoltenberg | ............... | E05D 15/38 |
| | | | | 49/199 |
| 7,419,204 B2 * | 9/2008 | Coble | ............... | B60P 1/435 |
| | | | | 296/146.9 |
| 9,151,095 B2 * | 10/2015 | Syring | ............... | E05B 17/0025 |
| 2006/0220410 A1 * | 10/2006 | Luehr | ............... | B60J 5/108 |
| | | | | 296/61 |
| 2010/0237653 A1 * | 9/2010 | Rydberg | ............... | B60J 5/108 |
| | | | | 296/182.1 |

(Continued)

FOREIGN PATENT DOCUMENTS

| | | | | |
|---|---|---|---|---|
| DE | 2352869 A1 * | 4/1975 | ............... | E05F 7/02 |
| DE | 4312025 A1 * | 10/1994 | ............... | H02B 1/28 |

(Continued)

*Primary Examiner* — Marcus Menezes
(74) *Attorney, Agent, or Firm* — Ryan M. Fountain

(57) ABSTRACT

A ramp door closure apparatus is provided for recreational vehicles, having a recessed linear actuator both draw a cable from a mounting bracket on the ramp door adjacent to the RV opening, to raise and lower the ramp door, and then cam a locking pin fixed to the ramp door into a seal tight position after the ramp door is raised. Upon release of the locking pin from the cam when opening the door, an initial push is provided to facilitate downward rotation of the ramp door. The linear actuator is selectively detachable from the cable so as to allow manual raising and lowering of the ramp door from within the RV, by means of releasable pins accessed in the mounting structure.

2 Claims, 5 Drawing Sheets

(56) References Cited

U.S. PATENT DOCUMENTS

2011/0307098 A1* 12/2011 Ennis ..................... G10L 15/26
                                                            700/275
2018/0216393 A1*  8/2018 Brandley .............. E05F 15/627

FOREIGN PATENT DOCUMENTS

| DE | 202013009425 U1 * | 1/2015 | ............ E05D 15/44 |
| EP |       1674647 A2 * | 6/2006 | ................ E05F 5/12 |
| WO |     WO-0171141 A1 * | 9/2001 | ............ E05F 15/627 |
| WO |    WO-03014505 A1 * | 2/2003 | ............. E05F 13/04 |

* cited by examiner

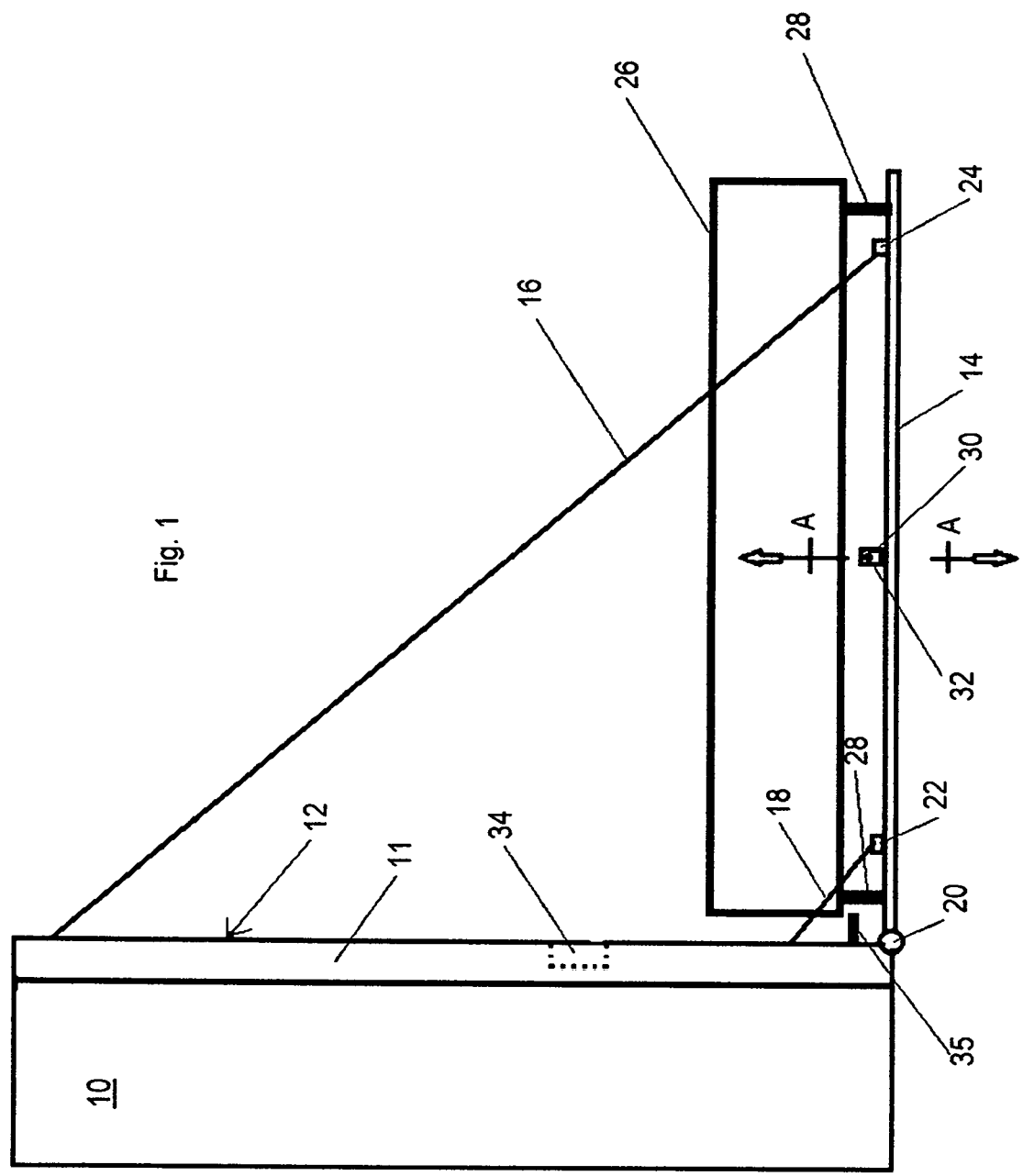

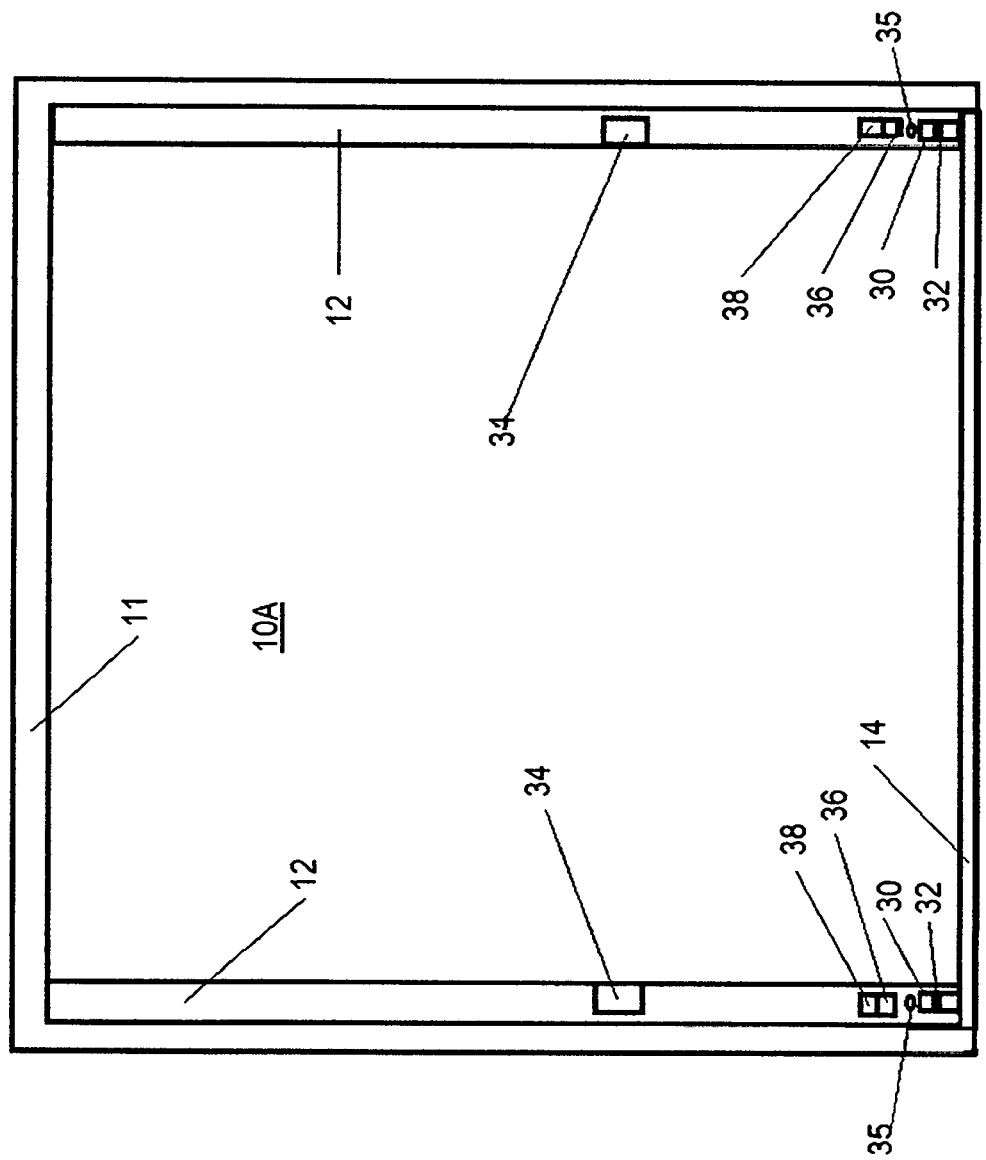

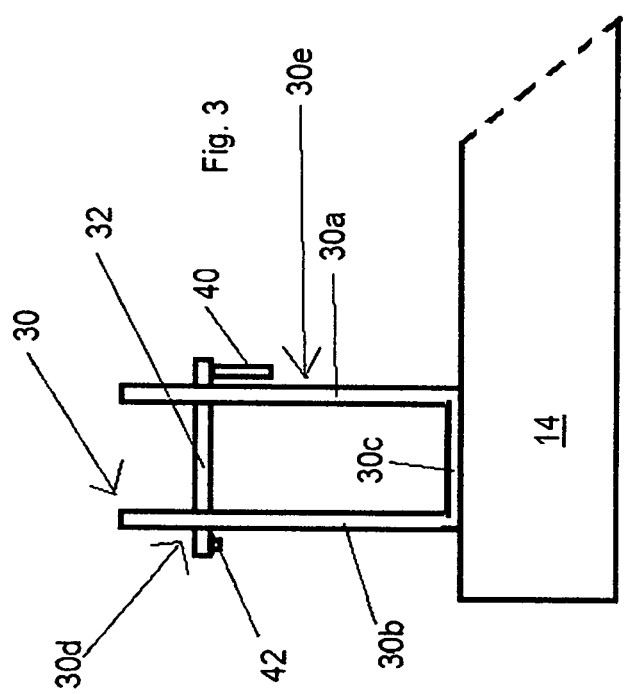

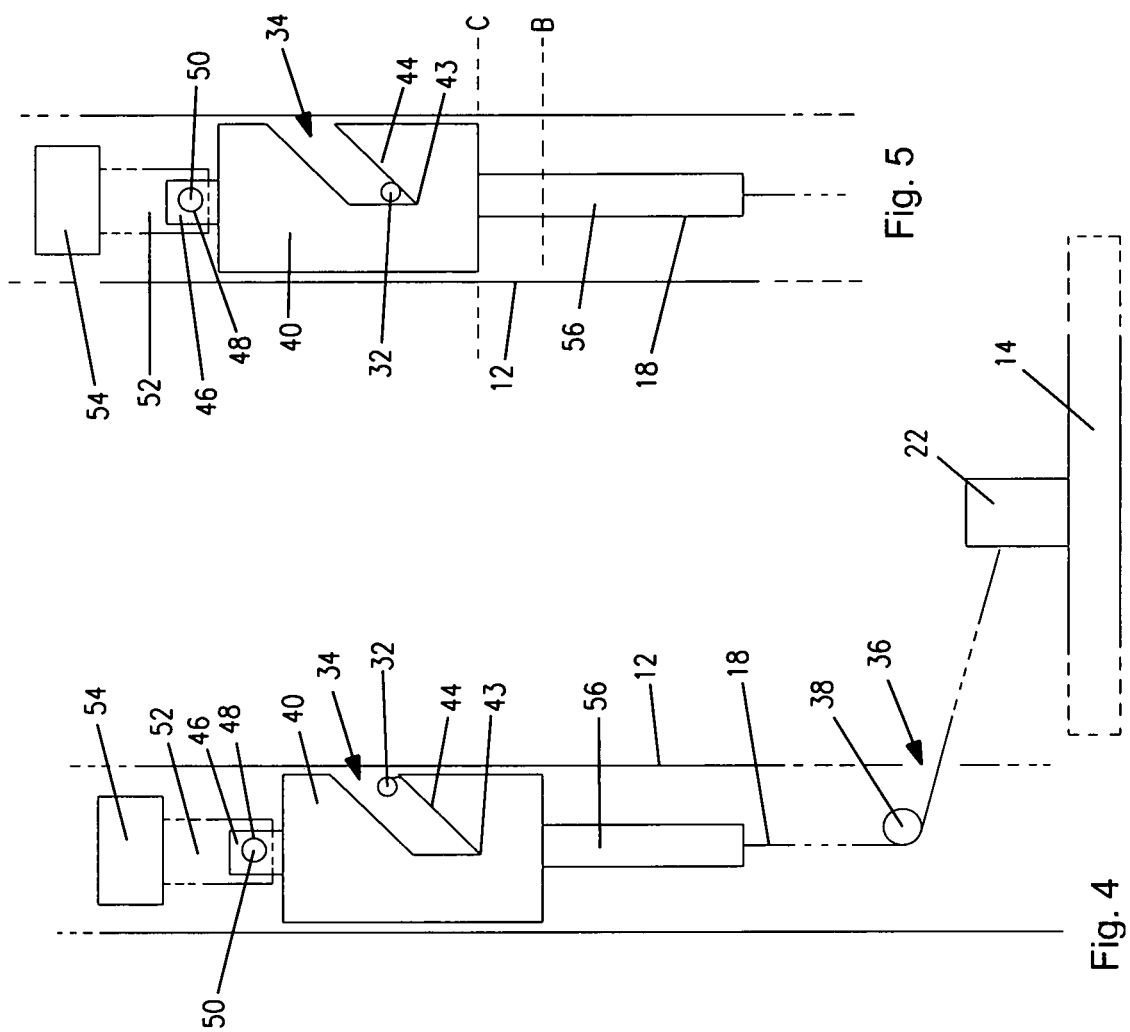

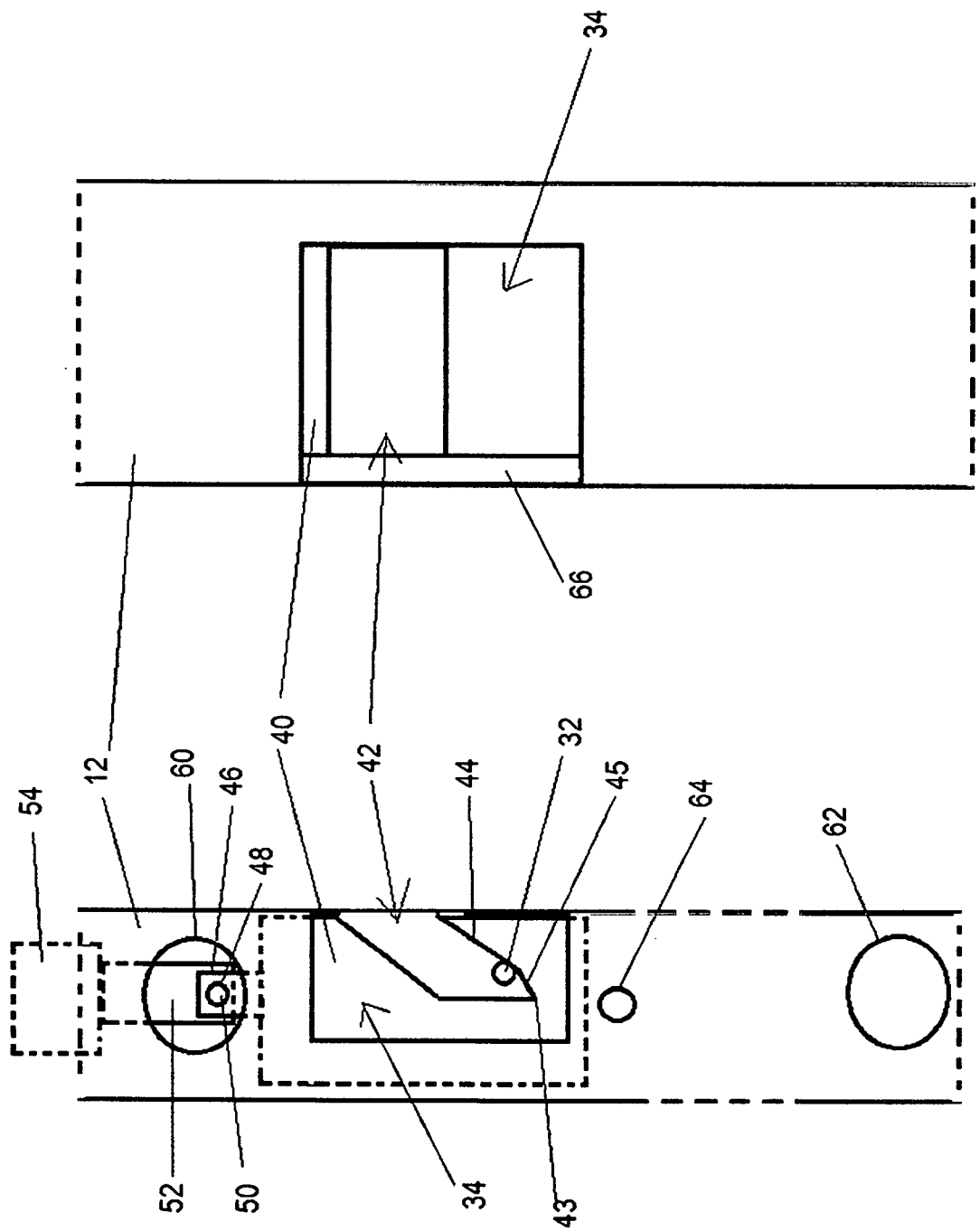

DRAW-TIGHT APPARATUS FOR RAMP DOORS AND THE LIKE

BACKGROUND OF THE INVENTION

The present invention relates generally to door closure apparatus, and more particularly, to apparatus for drawing ramp doors tightly closed when the door is fully raised to a closed position. The present invention has particular application to ramp doors that are mounted on vehicles, such as "fifth-wheel" and "toy hauler" types of travel trailers and motorized recreational vehicles ("RV's).

A wide variety of doors and door closure apparatus are known. In general, doors pivot typically about a hinge between open and closed positions to control movement through a door opening. When the hinge is established about a horizontal axis at the lower portion of the door opening, the door itself can be used as a ramp to aid in movement through the door opening when the door is open, as well as a barrier against movement through the door opening when the door is closed. Such doors are commonly referred to as "ramp doors." Such doors can also for the basis or floor of a patio when lowered to a horizontal position, typically in connection with removable or repositionable railings and support lines.

Ramp doors are typically provided with closure assisting apparatus, often because the ramp doors are relatively heavy, and lifting the ramp door into a closed position can be difficult for the user. Various closure assisting apparatus are known for use with ramp doors, including spring devices, which counterbalance the door weight, and powered lifting cables or chains, driven by a motor, which can be of various different types, including electrically or hydraulically driven and/or remotely controlled motors. However, these closure assisting apparatus do not always draw the door sufficiently tight against the frame of the door about the door opening. In certain applications, a fluid and/or air tight seal is needed for the door. A spring or cable-drive assist closure, for example, may not provide sufficient closure force to form such a seal.

Previously, it has been suggested to provide such draw-tight closure of doors, including ramp doors, by using supplemental mechanical closure levers or locking arms, especially those mounted on each side of the exterior of the ramp door.

However, those mechanical closure apparatus typically require the user to exert significant force in order to achieve the desired closure. Further, by placing those apparatus on the exterior of the door, the user is exposed to the exterior environment when so closing and sealing the door. Also, it is not possible to unlock and open the door against those mechanical closure apparatus from the inside area closed by the door. Still further, such mechanical closure apparatus can be relatively heavy and expensive, and substantially detract from the aesthetics of the door exterior.

In many applications, these disadvantages of those mechanical closure apparatus are not so important as to deter use. However, in vehicular applications of ramp doors, having to stand outside of a ramp door to secure it in adverse weather conditions, particularly from a standpoint well below the door hinge, is particularly disadvantageous. Further, being unable to open a ramp door from the vehicle interior is both a convenience and a safety detriment when the vehicle is a recreational vehicle, such as a fifth-wheel or toy hauler, where the user has living quarters within the vehicle. Also, having exterior closure apparatus exposed to the weather, may allow those apparatus to be covered with ice and snow in certain environments, which can further restrict the ability of the user to open the ramp door. In addition, prior exterior closure apparatus can require separate operating systems from the ramp door lifting systems, if the ramp door closure is to be automated.

In adapting prior operating systems and/or ramp door arrangements to RV use, there are certain special limitations and concerns to take into account. In general, RVs are preferably designed so as to minimize the weight of the RV, and thereby reduce the difficulty and cost of transporting the RV from site to site. Further, all components of a RV need to be constructed or assembled in such a way as to endure the vibrational stresses of road travel when the RV is moved, as well as a wide range of environmental conditions on site. Still too, an important objective in designing RVs is to keep the production and maintenance costs to a minimum.

OBJECTIVES OF THE INVENTION

Accordingly, a primary objective of the present invention is to provide improved ramp door closure assemblies for RVs. These improvements include providing ramp door closure assemblies which:

a. are inexpensive to make and reliable in operation,
b. permit the door to be raised and lowered both manually and with power assist,
c. minimize component weight,
d. can be retrofit into pre-existing RVs,
e. permit the ramp door to be raised and/or lowered from the interior or exterior of the RV, and
f. increase the aesthetic appearance of the RV by minimizing the need for bulky or unattractive exterior locking mechanisms.

SUMMARY OF THE INVENTION

These and other objectives of the present invention are achieved by the provision of a ramp door closure apparatus having a recessed linear actuator both draw a cable from a mounting bracket on the ramp door adjacent to the RV opening, to raise and lower the ramp door, and then cam a locking pin fixed to the ramp door into a seal tight position after the ramp door is raised. Upon release of the locking pin from the cam when opening the door, an initial push is provided to facilitate downward rotation of the ramp door. The linear actuator is selectively detachable from the cable so as to allow manual raising and lowering of the ramp door from within the RV, by means of releasable pins accessed in the mounting structure.

Other objects, advantages, and novel features of the present invention will become readily apparent from the following drawings and detailed description of certain preferred and alternative embodiments.

BRIEF DESCRIPTION OF THE DRAWINGS

FIG. 1 shows a left side view of the rear portion of an RV incorporating the teachings of the present invention.

FIG. 2 is a rear view of the RV of FIG. 1 (facing toward the front of the RV) from line AA looking forward, with the cables omitted for clarity.

FIG. 3 is an enlarged rear view of the left locking bracket assembly of FIG. 2.

FIG. 4 is an enlarged cross-sectional side view of the embodiment of FIG. 1 showing the ramp door open, but also showing the relative location of locking pin and draw block at initial closure of the ramp door.

FIG. 5 is an enlarged cross-sectional side view of the embodiment of FIG. 1 showing the relative location of the locking pin and draw block upon final closure.

FIG. 6 is an enlarged cross-sectional side view of an alternative embodiment of the draw block, showing the relative location of the locking pin and draw block upon final closure.

FIG. 7 is a rear view (facing toward the front of the RV) of a portion of the right lift tube at the location of the draw blocks.

DETAILED DESCRIPTION OF PREFERRED EMBODIMENTS

The following features are illustrated in the drawings:

Recreational vehicle 10 (showing only the rearward most portions), having a rear structural opening 10A, preferably formed from U-shaped or horseshoe shaped steel tubing 11 extending from the floor or base of the RV, Lift tubes 12, mounted at the interior of each side of tubing 11, Ramp door or wall 14, mounted to the RV for closing of opening 10A, preferably by abutment with lift tubes 12, and shown in an open, horizontal position which preferably extends from the interior floor of the RV, Support cables 16, preferably removably attached to ramp door 14 at each side thereof, for maintaining the horizontal position of ramp door 14 when that ramp door is in an open position, Lift cables 18 extending from each of the lift tubes and connected to the ramp door, Hinge 20 connected to the RV and the ramp door, to allow the ramp door to rotatably move between open and closed positions, Lift brackets or flange 22, preferably attached to each side of the ramp door, each for receiving and retaining a lift cable thereto, Support brackets or flanges 24, preferably attached to each side of the ramp door, each for receiving and retaining a support cable thereto, Adjustable railing 26, of any convenient or conventional nature, for being movably positioned on the ramp door when it is in a horizontal position, so as to serve as a patio railing or safety rail to aid users standing on the ramp door, Railing posts 28, to removably connect railing 26 to the ramp door, Locking pin brackets 30, mounted on each side of the ramp door, and each preferably formed with upwardly projecting, spaced apart side walls 30a and 30b, joined by a bight wall 30c adjacent ramp door 14, and a first pair and a second pair of aligned openings 30d and 30e in side walls 30a and 30b, the second pair being vertically and/or horizontally spaced apart from the first pair, as needed for the purposes described below, Locking pins 32 removably mounted in either pair of openings 30d or 30e, preferably having a conventional pull ring 40 mounted adjacent one end and a detent ball or clevis pin 42 mounted adjacent the opposing end thereof, Front openings 34 in lift tubes 12, each spaced vertically along the lift tubes to align with and receive one of locking pins 32 when ramp door is closed against then lift tubes, Push out arm 35, mounted within or adjacent one or both of the lift tubes, preferably comprising a compressible strut within a gas piston or spring biasing means, to allow the ramp door to be initially pushed toward opening upon release of any locking mechanism, Front openings 36 in lift tubes 12, to each permit one of lift cables 18 to pass therethrough, Pulleys or rollers 38, mounted in lift tubes 12 to redirect the motion of lift cables 18 as the ramp door is raised and lowered, Draw blocks 40, movably disposed within each of lift tubes 12, and each having a slot 42 therein for receiving a portion of a locking pin 32 when those pins are within aligned openings 30d, including a camming surface 44 for engagement with the locking pin and drawing that locking pin toward slot bottom 43, (Although camming surface 44 is shown to be linear in FIGS. 4 and 5, an curved or second linear surface 45 may be used in conjunction therewith in alternative embodiments, as shown in FIG. 6), Mounting tab or extension 46, formed with or attached to each of draw blocks 40, having openings 48 therethrough for removably receiving a connection pin or bolt 50, Linear actuators each mounted within one of lift tubes 12, preferably of a conventional nature (such as having a worm-gear driven shaft driven by a rotating motor), having vertically extendable drive shafts 52 removably connected to extensions 46 via pins 50, and actuating motors 54 connected to drive shafts 52 for controlling the extension or retraction of those drive shafts within the lift tubes, the motors being operated by conventional electrical or hydraulic devices, according to the control signally of the RV user, Spring assemblies 56, each attached to one of the draw blocks, for connecting the draw blocks to one of cables 18, and being of either a compression or torsion type, as desired in a particular application, Side openings 60 in each lift tube, allowing user access to connection pins 50 when the ramp door is in a vertical, closed position, Side openings 62 in each lift tube, allowing user access to connection pins 50 when the ramp door is in a horizontal, open position, Side aligned openings 64 in each lift tube, each vertically spaced along the lift tubes to align with openings 30e of the locking pin brackets and removably receive therein a portion of a portion of locking pins 32 when those locking pins are within openings 30e of the locking pin brackets, and Side openings 66 in each lift tube extending laterally from front openings 34, allowing user access to pull rings 40 of locking pins 32.

In operation, when the ramp door is to be raised, the linear actuator causes the drive shafts to lift cables 18 within the lift tubes to rotate the ramp door upward about hinge 20 from a horizontal to a vertical position adjacent the lift tubes. When cables 18 are fully retracted, locking pin 32 is positioned just inside draw block 40 at the position shown in FIG. 4. The portion of locking pin 32 so engaged by draw block 40 can be the portion intermediate sides 30a and 30b of the locking pin bracket, but is preferably the portion extending out of side 30b and cantilevered therefrom.

For draw tight closure, the linear actuator the continues to cause the drive shafts to move the draw blocks from position B to position C, as shown in FIG. 5, with the spring assemblies accommodating that additional motion, since the lift cables are preferably not elastic.

To open or close the ramp door from within the RV when the linear actuator is not operating, pins 50 can be removed to disconnect the drive shafts and locking pin 32 can be removed, via ring 40. Reinserting locking pin 32 into openings 30e and 64 will allow the ramp door to be manually locked closed independently of the linear actuator.

Although the present invention has been shown and described herein with respect to certain preferred embodiments and alternative configurations, those were by way of illustration and example only. For example, the present invention has been illustrated in connection with a rear ramp door of an RV, but the teachings of this invention are readily applied to a side ramp or fold up patio wall of an RV. Accordingly, the spirit and scope of the present invention is intended to be limited only by the terms of the appended claims.

What is claimed is:

1. An apparatus, for raising and lowering a wall to control access to a structural opening, comprising:
   the wall having a hinge at one end of the wall, connecting the wall to the structural opening, so as to allow the wall to be raised and lowered with respect to the opening,
   a cable having two ends, one of which is connected to the wall, for controlling motion of the wall with respect to the hinge,
   a linear actuator arrangement connected to the other end of the cable, for controlling motion of the cable,
   said linear actuator arrangement having two motive stages, one of which causes motion of the cable which raises or lowers the wall, and the other of which causes motion of the wall relative to said linear actuator arrangement when the cable is not moving,
   wherein the wall has a projection therefrom, and said linear actuator arrangement includes a cam for receiving said projection when the wall is raised, and motion of said linear actuator arrangement draws the projection to close the wall completely into the structural opening, and
   wherein said linear actuator arrangement includes at least:
      a vertically extendable drive shaft,
      a draw block forming at least a portion of the cam, and having a slot therein for receiving the projection, and
      a spring assembly attached between the draw block and the cable, such that when the cable is fully retracted the draw block remains movable, so as to move the projection within the slot.

2. An apparatus, for raising and lowering a wall to control access to a structural opening, comprising:
   the wall having a hinge at one end of the wall, connecting the wall to the structural opening, so as to allow the wall to be raised and lowered with respect to the opening,
   a cable having two ends, one of which is connected to the wall, for controlling motion of the wall with respect to the hinge,
   a linear actuator arrangement connected to the other end of the cable, for controlling motion of the cable,
   said linear actuator arrangement having two motive stages, one of which causes motion of the cable which raises or lowers the wall, and the other of which causes motion of the wall relative to said linear actuator arrangement when the cable is not moving,
   wherein:
      the structural opening is formed in a recreational vehicle,
      the wall serves as a ramp door for the structural opening,
      the apparatus also has locking means to releasably secure the wall in a closed position against the recreational vehicle, and
      the apparatus also has a push out arrangement to initially move the wall away from engagement with the structural opening when the locking means is released,
   wherein said linear actuator arrangement includes structure which allows said linear actuator arrangement to be selectively detachable from the cable, in order to allow the wall to be manually raised or lowered, and
   wherein the linear actuator arrangement includes at least:
      a vertically extendable drive shaft,
      a draw block forming at least a portion of the cam, and having a slot therein for receiving the projection, and
      a spring assembly attached between the draw block and the cable, such that when the cable is fully retracted the draw block remains movable to move the projection within the slot.

* * * * *